United States Patent Office 3,573,074
Patented Mar. 30, 1971

3,573,074
HALIDE NUCLEATED GLASS-CERAMIC ARTICLES GIVING MIE LIGHT SCATTERING
David A. Duke and Thomas R. Kennedy, Corning, N.Y., assignors to Corning Glass Works, Corning, N.Y.
No Drawing. Filed Mar. 8, 1968, Ser. No. 711,534
Int. Cl. C04b 33/00
U.S. Cl. 106—39                              2 Claims

ABSTRACT OF THE DISCLOSURE

This invention relates to the production of glass-ceramic articles in the $Li_2O$—$Na_2O$—$Al_2O_3$—$SiO_2$ composition field which are nucleated with NaF to form beta-quartz solid solution and/or beta-spodumene solid solution as the principal crystal phase therein. These glass-ceramic articles may be translucent and, having crystals of a proper size and with an index of refraction much different from that of the residual glass, exhibit good volume scattering characteristics for visible light, thereby making them especially suitable for such applications as rear view projection screens.

---

The manufacture of glass-ceramic or semicrystalline ceramic articles, as such have been variously termed, involves the controlled crystallization of glass articles in situ. In general, a glass-forming batch commonly containing a nucleating agent or crystallization catalyst is melted, the melt simultaneously cooled to a glass and an article of a desired configuration shaped therefrom, and this glass article then subjected to a predetermined heat treating scheduled. Normally, this heat treatment consists of two parts: a nucleation step at temperatures between the annealing and softening points of the glass wherein submicroscopic particles of the nucleating agent or crystallization catalyst are developed and crystallization initiated, and then a crystallization step carried out at temperatures higher than than those employed for nucleation in order to grow crystals on the sites provided by the nuclei. Some nuclei may be formed as the melt is being cooled to a glass but, generally, the melt is cooled so rapidly in order to avoid devitrification therein that the development of nuclei during this step of production is very minor. Since the countless numbers of nuclei are dispersed throughout the glassy body, the crystallization produced is relatively uniformly fine-grained, substantially homogeneously dispersed throughout a glassy matrix, and comprises the major proportion of the final article, i.e., the glass-ceramic article is more than about 50% by weight crystalline. The glassy matrix is composed of the uncrystallized portion of the base glass remaining after the glass article has been crystallized in situ. The uniformly fine-grained crystal size of a glass-ceramic article is opposed to the heterogeneously-sized crystallization occurring in the normal devitrification of glass.

Since a glass-ceramic article is more crystalline than glass, the article usually exhibits the chemical and physical characteristics of the crystals present therein rather than those of the parent glass. It can also be appreciated that the composition of the glassy matrix is different from that of the original glass because of certain components thereof being incorporated as the crystal phase. Further, since the crystallization occurred in situ, a glass-ceramic article is unlike the conventional sintered ceramic article in being free of voids and non-porous. Finally, because a glass-ceramic article is produced from a glass body, the conventional glass-forming methods of fabrication such as blowing, casting, drawing, pressing, rolling, etc. can be employed. For a more complete discussion of the manufacture of glass-ceramic articles, reference is hereby made to U.S. Pat. No. 2,920,971.

We have now discovered a group of glass compositions within the $Li_2O$—$Na_2O$—$Al_2O_3$—$SiO_2$ field which can be nucleated with NaF to yield uniformly fine-grained glass-ceramic articles whose appearances range from opaque to nearly transparent, the crystals of which are of a size and an index of refraction much different from that of the residual glass such that they impart good-light scattering characteristics to the articles. The glasses of this invention consist esentially, in weight percent on the oxide basis, of about 55–57% $SiO_2$, 15–25% $Al_2O_3$, 1–5% $Li_2O$, 2–10% $Na_2O$, and 3–10% halide, said halide consisting of 1.5–9% F and 0–3% Cl. Since it is not known with which cation fluorine and chlorine are combined in the glass, they are reported separately as the fluoride and the chloride in accordance with conventional glass analysis practice. Various compatible metal oxides in amounts up to about 10% by weight total such as MgO, CaO, SrO, BaO, $K_2O$, ZnO, and PbO can be added to modify the melting and forming qualities of the glass or the chemical and physical properties of the final product. Nevertheless, the total of all additions outside of the basic five components should not exceed about 12%.

We have found that the above-defined composition ranges for the five essential constituents are critical to obtain glass-ceramic articles having the desired structure.

In its broadest aspects, then, our invention contemplates compounding a batch falling within the above composition ranges, melting this batch at a temperature and for a time sufficient to insure a homogeneous melt, cooling this melt sufficiently rapidly to secure an essentially crystal-free glass, and thereafter subjecting the glass article to a heat treating schedule whereby nuclei are first developed therein and crystals are subsequently grown on these nuclei.

Table I records examples of glasses having compositions falling within the above-mentioned ranges, expressed in weight percent on the oxide basis. It will be appreciated that the batch ingredients for these glasses can comprise any materials, either oxides or other compounds, which, on being melted together, are converted to the desired oxide compositions in the proper proportions. The batch materials were dry ball milled together, placed in open platinum crucibles, and melted for about six hours at 1450° C. The melt was then poured and rolled into a round patty about ⅜″ thick and about 5″ in diameter which was placed in an annealer operating at 550° C. The melts were quite fluid so no fining agent was actually necessary although $As_2O_3$, $As_2O_5$, and $Sb_2O_3$ demonstrated no harmful effect on the subsequent crystallization when they were added to determine their utility as fining agents.

The glass patties were then cut into bars about ½″ wide, these bars inserted in an electric furnace, heated to the nucleation range (about 550°–700° C.), maintained within that temperature range for a sufficient length of time to assure the substantial development of nuclei, and thereafter heated to the crystallization range (about 700°–1000° C.) for a sufficient length of time to cause a major proportion of the glass to crystallize.

These glasses commonly nucleate very quickly and periods of time ranging about ¼–2 hours within the nucleation range are usually quite adequate to attain satisfactory nucleation with one hour frequently being utilized. Much longer nucleation times can be employed successfully and crystals will begin to grow on the nuclei after long dwell periods at these temperatures. However, this practice is not commercially economical and the nucleated article is normally heated to a higher temperature to expedite crystal growth.

The growth of crystals upon the nuclei is very rapid at temperatures within the crystallization range and times varying about ¼–2 hours are normally quite ample to secure highly crystalline products. As is to be expected in all time-temperature dependent processes, the rate of crystal growth increases as the temperature is raised. Similarly to the situation noted above with respect to the nucleation step, much longer maintenance periods, say 24 hours, within the crystallization range can be utilized with no adverse effect upon the crystallized article but there is no practical advantage in so doing.

TABLE I.—PERCENTAGES

|  | 1 | 2 | 3 | 4 | 5 | 6 | 7 |
|---|---|---|---|---|---|---|---|
| $SiO_2$ | 59.24 | 59.05 | 60.58 | 59.43 | 58.27 | 58.87 | 58.28 |
| $Al_2O_3$ | 21.73 | 21.73 | 22.22 | 21.79 | 21.38 | 21.58 | 21.38 |
| $Na_2O$ | 6.73 | 6.73 | 6.88 | 6.75 | 6.62 | 6.68 | 6.62 |
| $Li_2O$ | 3.36 | 3.36 | 3.44 | 3.37 | 3.31 | 3.34 | 3.31 |
| MgO | 1.92 | 1.92 | 2.95 | 3.85 | 5.67 |  | 2.84 |
| BaO | 2.40 | 2.40 |  |  |  | 4.77 |  |
| PbO | 0.48 |  |  |  |  |  |  |
| $Sb_2O_3$ | 0.29 |  |  |  |  |  |  |
| $As_2O_3$ |  | 0.96 |  | 0.96 | 0.96 | 0.95 | 0.95 |
| F | 3.85 | 2.89 | 2.95 | 2.89 | 2.83 | 2.86 | 2.84 |
| Cl |  | 0.96 | 0.98 | 0.96 | 0.96 | 0 95 | 0.94 |

|  | 8 | 9 | 10 | 11 | 12 | 13 | 14 |
|---|---|---|---|---|---|---|---|
| $SiO_2$ | 57.73 | 59.69 | 59.70 | 58.86 | 60.58 | 65.81 | 65.12 |
| $Al_2O_3$ | 21.18 | 21.90 | 23.28 | 21.58 | 22.22 | 18.16 | 17.98 |
| $Na_2O$ | 6.56 | 6.79 | 6.79 | 9.55 | 4.92 | 4.81 | 7.39 |
| $Li_2O$ | 3.28 | 4.85 | 3.46 | 3.34 | 3.44 | 3.74 | 2.11 |
| MgO | 7.50 | 2.90 | 2.90 | 2.86 | 4.91 | 3.21 | 3.17 |
| F | 2.81 | 2.90 | 2.90 | 2.86 | 2.95 | 3.21 | 3.17 |
| Cl | 0.94 | 0.97 | 0.97 | 0.95 | 0.98 | 1.06 | 1.06 |

|  | 15 | 16 | 17 | 18 | 19 | 20 |
|---|---|---|---|---|---|---|
| $SiO_2$ | 58.36 | 57.82 | 60.60 | 59.17 | 56.72 | 72.50 |
| $Al_2O_3$ | 23.67 | 23.45 | 22.22 | 21.68 | 20.79 | 14.49 |
| $Na_2O$ | 8.04 | 6.56 | 1.96 | 6.71 | 6.43 | 2.89 |
| $Li_2O$ | 3.31 | 5.62 | 3.44 | 0.95 | 3.21 | 3.38 |
| MgO | 2.84 | 2.81 | 3.93 | 7.67 | 2.75 | 2.89 |
| BaO |  |  | 3.93 |  |  |  |
| F | 2.84 | 2.81 | 2.94 | 2.87 | 9.19 | 2.89 |
| Cl | 0.94 | 0.93 | 0.98 | 0.95 | 0.91 | 0.96 |

In the examples of Table I, the glass bodies were heated to the nucleation range and the crystallization range at 200° C./hour. It can be appreciated that slower or faster heat-up rates are operable where very thick or very thin shapes, respectively, are being treated. The 200° C./hour rate has been found to be satisfactory in most instances in obviating breakage due to thermal shock and excessive deformation of the glass body as it is being heated above its softening point and before crystallization has progressed to a sufficient extent to support the body. Crystallization of the glass body proceeds more rapidly as the temperature is raised. Thus, in the early stages of crystallization, the proportion of glassy matrix to crystals is very large and the body will readily deform if the temperature thereof is raised too rapidly in the vicinity of the glass softening point. Hence, the rate of temperature rise should, preferably, balance the rate at which crystals are growing within the glass. From this factor, then, it can be seen that no dwell periods, as such, need be utilized within the nucleation and crystallization ranges but, rather, merely a schedule contemplating a gradual temperature rise. Nevertheless, the employment of dwell periods within the nucleation and crystallization stages assure the requisite nucleation and subsequent crystal growth and is the preferred practice of the invention.

The rate of cooling the crystallized article to room temperature is also dependent upon its resistance to thermal shock and here, again, the size of the body and the top heat treating temperature used dictate the rate selected. A 200° C./hour cooling rate has produced sound products in all the articles tried by use. Much faster rates have been employed with small articles with no breakage thereof. Merely as a matter of convenience, the crystallized articles resulting from the examples of Table I were left in the heat treating furnace after each schedule was completed, the power to the furnace cut off, and the furnace allowed to cool overnight at its own rate with the articles retained therein. This rate of cooling was estimated to average about 3° C./minute.

Finally, where fuel economies and speed of production in obtaining the glass-ceramic article are sought, the glass shapes need not be cooled to room temperature and then reheated into the nucleation and crystallization ranges. The cooling to room temperature allows the visual observation of glass quality. Instead, the glass melt can be cooled to just below the transformation range, i.e., the temperature at which a liquid melt is deemed to have been transformed into an amorphous solid, and the glass then subjected to the necessary heat treating schedule. The transformation range is a temperature in the vicinity of the annealing point of a glass which with the compositions of this invention, ranges from about 500°–650° C.

Table II records the heat treatment schedule to which each example was subjected along with a visual description of each crystallized article, a measurement of the coefficient of thermal expansion (25°–300° C.), a measurement of the density, and the crystal phases present as determined by X-ray diffraction analysis.

The final articles are highly crystalline, i.e., frequently containing more than 75% by weight crystals. The crystals, themselves, generally vary in size from about 0.1–20 microns in diameter with the preferred size being about 0.5–5 microns. In Table II, a report of coarse crystallization reflects the presence of some crystals greater than 5 microns in diameter.

TABLE II

| Example No. | Heat treatment | Visual description | Crystal phases | Expansion coeff. ($\times 10^{-7}$/°C.) | Density |
|---|---|---|---|---|---|
| 1 | 700° C. for 1 hour / 750° C. for 1 hour | Opaque, white, finely crystalline. | Beta-quartz solid solution |  |  |
| 2 | 700° C. for ¼ hour / 750° C. for ¼ hour | Translucent, grey, very finely crystalline. | do |  |  |
| 3 | 700° C. for 1 hour / 800° C. for 1 hour | Opaque, grey, finely crystalline. | do | 43.1 | 2.544 |
| 4 | 700° C. for 1 hour / 800° C. for 1 hour | Opaque, grey white, finely crystalline. | do | 43.6 | 2.471 |
| 5 | 700° C. for 1 hour / 800° C. for 1 hour | Slightly translucent, grey, very finely crystalline. | do | 48.0 | 2.493 |
| 6 | 700° C. for 1 hour / 850° C. for 1 hour | Opaque, white, coarsely crystalline. | Beta-spodumene solid solution |  |  |
| 7 | 700° C. for 1 hour / 750° C. for 1 hour / 700° C. for 1 hour / 800° C. for 1 hour | Opaque, white, very finely crystalline. / Opaque, white, finely crystalline. | Beta-quartz solid solution / Beta-spodumene solid solution | 46.9 | 2.512 |
| 8 | 700° C. for 1 hour / 750° C. for 1 hour / 700° C. for 1 hour / 800° C. for 1 hour | Transparent, very finely crystalline. / Slightly translucent, grey, very finely crystalline. | Beta-quartz solid solution / do | 50.9 | 2.509 |
| 9 | 550° C. for 1 hour / 750° C. for 1 hour | Opaque, white, finely crystalline. | Beta-spodumene solid solution |  |  |
| 10 | 700° C. for 1 hour / 750° C. for 1 hour / 700° C. for 1 hour / 800° C. for 1 hour | Slightly translucent, grey, very finely crystalline. / Opaque, grey, very finely crystalline. | Beta-quartz solid solution / do | 44.7 | 2.450 |

TABLE II.—Continued

| Example No. | Heat treatment | Visual description | Crystal phases | Expansion coeff. (×10⁻⁷/°C.) | Density |
|---|---|---|---|---|---|
| 11 | 700° C. for 1 hour / 750° C. for 1 hour | Opaque, white, finely crystalline. | Beta-spodumene solid solution | | |
| 12 | 700° C. for 1 hour / 850° C. for 1 hour | ----do---- | Beta-quartz solid solution | 40.0 | 2.477 |
| 13 | 700° C. for 1 hour / 750° C. for 1 hour | Opaque, white, very finely crystalline. | ----do---- | 31.4 | 2.468 |
| 14 | 700° C. for 1 hour / 850° C. for 1 hour | ----do---- | ----do---- | 72.3 | 2.424 |
| 15 | 700° C. for 1 hour / 800° C. for 1 hour | Opaque, grey, very finely crystalline. | ----do---- | 51.5 | 2.458 |
| 16 | 700° C. for 1 hour / 1,000° C. for 1 hour | Opaque, grey white, finely crystalline. | Beta-spodumene solid solution | | |
| 17 | 700° C. for 1 hour / 850° C. for 1 hour | Opaque, white, coarse-grained. | ----do---- | | |
| 18 | 700° C. for 1 hour / 850° C. for 1 hour | Translucent, grey, very finely crystalline. | Beta-quartz solid solution | | |
| 19 | 700° C. for 1 hour / 850° C. for 1 hour | Opaque, white, coarse-grained. | Beta-spodumene solid solution | | |
| 20 | 700° C. for 1 hour / 850° C. for 1 hour | Opaque, white, finely crystalline. | ----do---- | | |

Tables I and II clearly demonstrate the composition and heat treating parameters which yield desirable glass-ceramic articles. Hence, articles varying in optical density from opaque to transparent are illustrated. The effect of heat treatment is dramatically demonstrated in such examples as 8 and 10 where the optical density is shown to have been altered by utilizing different crystallization temperatures. Example No. 7 heat treated to produce crystals of beta-quartz solid solution constitutes the preferred embodiment of our invention for its light scattering characteristics.

There are two distinct modes by which light energy can be removed by a medium. One of these, viz., atomic absorption, results in the light energy being converted into heat energy which then heats the medium. The other, light scattering, contemplates the absorption and simultaneous re-radiation of energy by atomic, molecular, or ionic species.

This light scattering phenomenon is due essentially to the radiation of secondary waves caused by oscillating dipoles induced in heterogeneities in the medium through which the light is passing. A light wave is constituted by electrical and magnetic vibrations in planes perpendicular to the direction of wave propagation. With an aggregate of atoms or ions, such as the molecules in a gas or a small crystallite in a glass, dipoles are formed in each element of volume in the presence of an external electric field which are induced by the field. When the electric field is due to an electromagnetic wave, the induced dipoles themselves become radiators of electromagnetic waves and scattered light results therefrom.

There are two general types of light scattering. These are commonly referred to as (1) Rayleigh scattering and (2) Mie scattering. In Rayleigh scattering the scattering particle is small with respect to the wavelength of the incident light with the result that the net scattered wave is inversely dependent upon the fourth power of the wavelength. This type is thus characterized by considerable scattering of blue and ultra-violet light with a minimum of scattering in the longer wavelengths.

In Mie scattering the scattering particle is about the same size or larger than the wavelength of the incident radiation. This provides a uniform scattering intensity independent of the wavelength.

Our invention relates to a solid material in which crystals can be grown of the proper index of refraction and size to exhibit Mie scattering. Fluoride nucleation of these glasses eliminates the need of other common nucleating agents such as $TiO_2$ and $ZrO_2$ which appear to act as Rayleigh scatterers. The refractive index of the residual glass in the β-quartz glass-ceramics is apparently quite different from that of the scattering particles and, thus, beneficial for Mie scattering. Example No. 7 is a glass which has been crystallized to a β-quartz solid solution with a particle size and an index of refraction such that the material has these good light scattering characteristics.

We claim:

1. A glass-ceramic article consisting essentially of relatively uniformly-sized beta-quartz solid solution and/or beta-spodumene solid solution crystals dispersed substantially homogeneousy in a glassy matrix and constituting the major proportion of the article, said crystals having a diameter at least as large as the wave length of visible light, but less than 20 microns, to impart excellent light scattering characteristics of the Mie type to said article and being formed through the crystallization in situ of a glass article consisting essentially, by weight on the oxide basis, of about 1–5% $Li_2O$, 2–10% $Na_2O$, 15–25% $Al_2O_3$, 55–75% $SiO_2$, and 3–10% halide, said halide consisting essentially of 1.5–9% F and 0–3% Cl.

2. A glass ceramic article in accordance with claim 1 wherein said beta-quartz solid solution and/or beta-spodumene solid solution crystals are substantially all between about 0.5–5 microns in diameter.

References Cited

UNITED STATES PATENTS 3,157,522  11/1964  Stookey _____ 106—52
3,253,975  5/1966  Olcott et al. _____ 106—39X

FOREIGN PATENTS 848,447  9/1960  Great Britain _____ 106—39

OTHER REFERENCES

McMillan, P. W.; glass-ceramics; London, 1964, pp. 71–73 (TP 862M3).

HELEN M. McCARTHY, Primary Examiner

W. R. SATTERFIELD, Assistant Examiner

U.S. Cl. X.R.

350—117; 240—46.59; 65—33